E. A. BARBET.
TREATMENT OF PYROLIGNEOUS LIQUIDS FROM THE CARBONIZATION OF WOOD.
APPLICATION FILED OCT. 14, 1918.

1,371,461.

Patented Mar. 15, 1921.
5 SHEETS—SHEET 1.

Inventor
E. A. Barbet
By H. R. Kerslake
Atty

E. A. BARBET.
TREATMENT OF PYROLIGNEOUS LIQUIDS FROM THE CARBONIZATION OF WOOD.
APPLICATION FILED OCT. 14, 1918.
1,371,461.
Patented Mar. 15, 1921.
5 SHEETS—SHEET 2.
Fig.1.A.
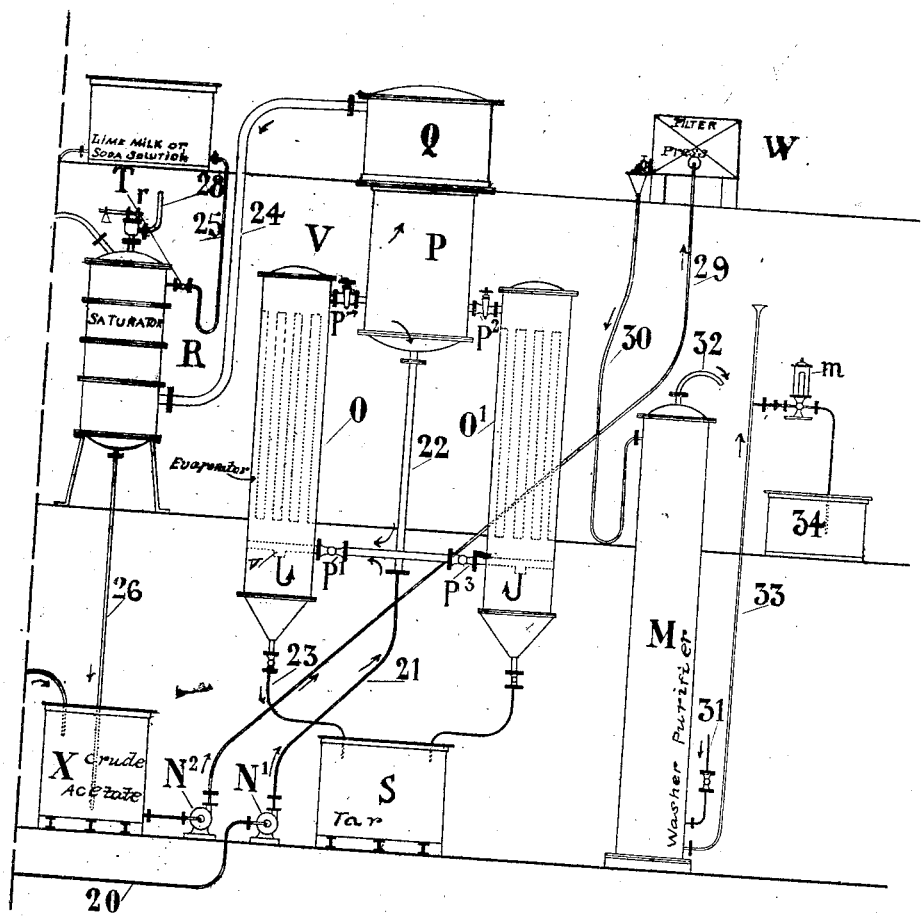

E. A. BARBET.
TREATMENT OF PYROLIGNEOUS LIQUIDS FROM THE CARBONIZATION OF WOOD.
APPLICATION FILED OCT. 14, 1918.
1,371,461.
Patented Mar. 15, 1921.
5 SHEETS—SHEET 3.
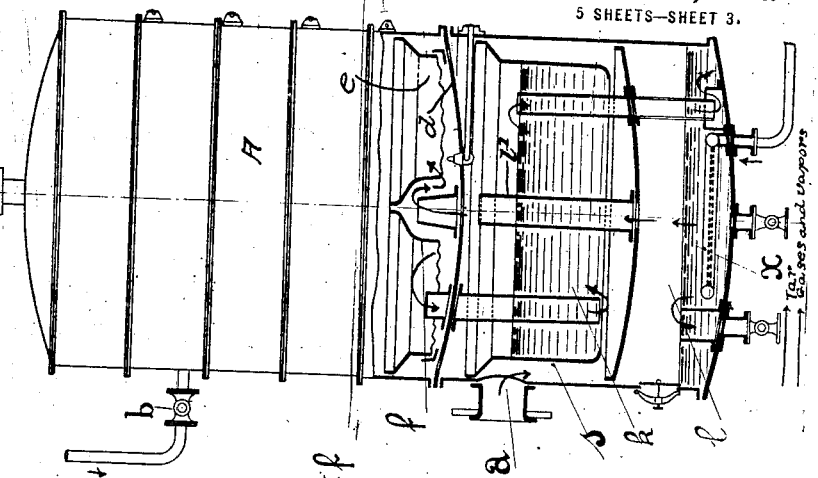
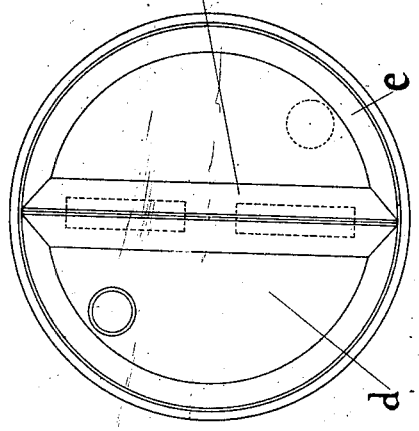
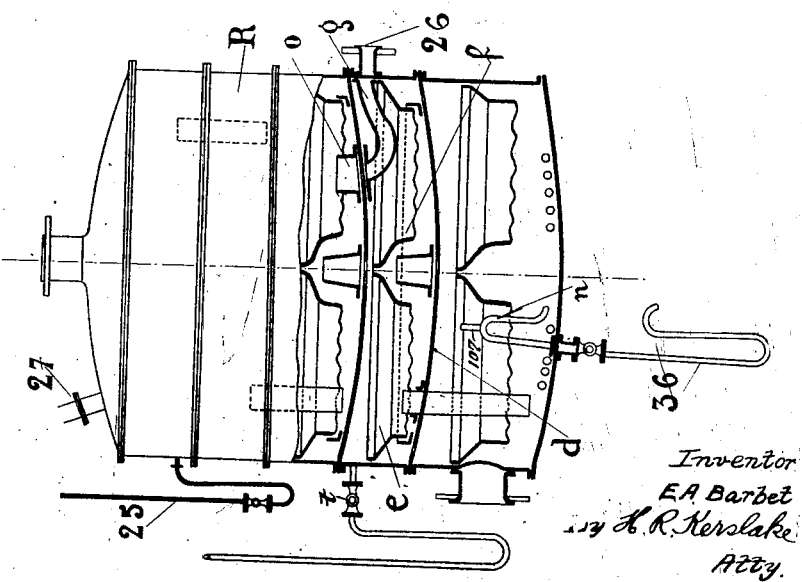
Inventor
E.A. Barbet
by H. R. Kerslake
Atty.

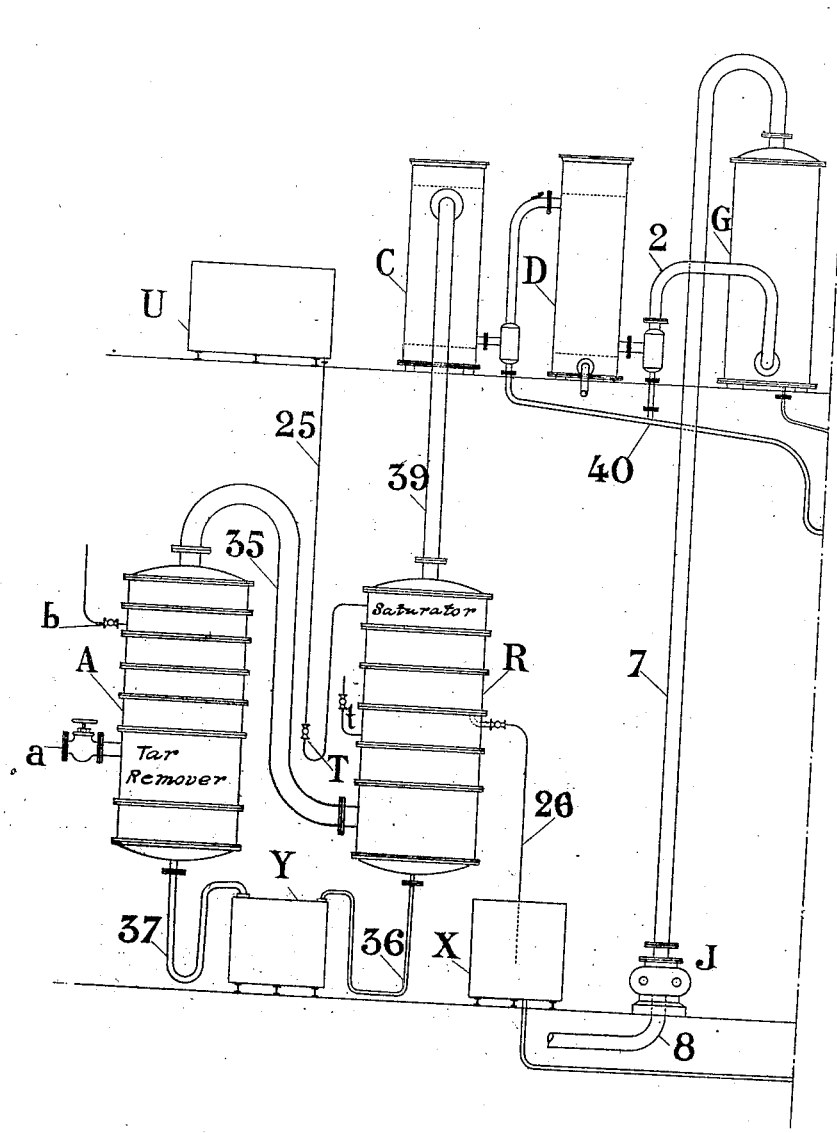

E. A. BARBET.
TREATMENT OF PYROLIGNEOUS LIQUIDS FROM THE CARBONIZATION OF WOOD.
APPLICATION FILED OCT. 14, 1918.
1,371,461.
Patented Mar. 15, 1921.
5 SHEETS—SHEET 5.
Fig. N° 5A
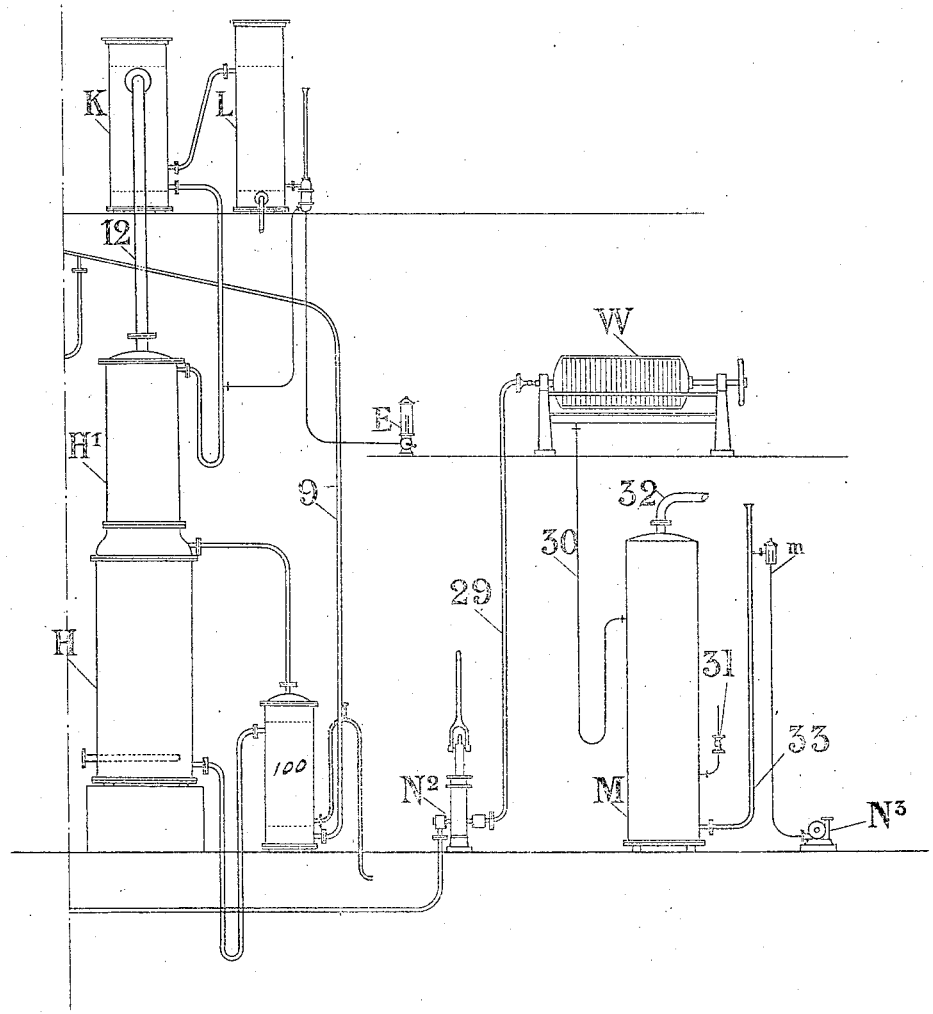

UNITED STATES PATENT OFFICE.

EMILE AUGUSTIN BARBET, OF PARIS, FRANCE.

TREATMENT OF PYROLIGNEOUS LIQUIDS FROM THE CARBONIZATION OF WOOD.

1,371,461.  Specification of Letters Patent.  Patented Mar. 15, 1921.

Application filed October 14, 1918. Serial No. 258,112.

*To all whom it may concern:*

Be it known that I, EMILE AUGUSTIN BARBET, citizen of the French Republic, residing at 5 Rue de l'Echelle, Paris, France, have invented certain new and useful Improvements in the Treatment of Pyroligneous Liquids from the Carbonization of Wood, of which the following is a specification.

In the treatment of the pyroligenous liquids the greatest difficulty consists in the elimination as complete as possible of the tars in order to obtain acetates of lime or of soda as white and as pure as possible.

This invention relates to a process by which one can obtain these results in a continuous way and to continuous apparatus designed for carrying out the said process.

In the description which follows, there is first briefly indicated the succession of the operations; then the main apparatus elements are described more in detail in order to show how they are constructed for answering to the purpose aimed at.

In the accompanying drawing:

Fig. 2 shows, on an enlarged scale, the tar removing apparatus;

Fig. 3 is a plan view of a plate employed in the device of Fig. 2;

Fig. 4 is a detail view of a modified and improved form of the saturator, and

Fig. 5 is a diagrammatic view of a modification of the whole plant.

Figure 1:
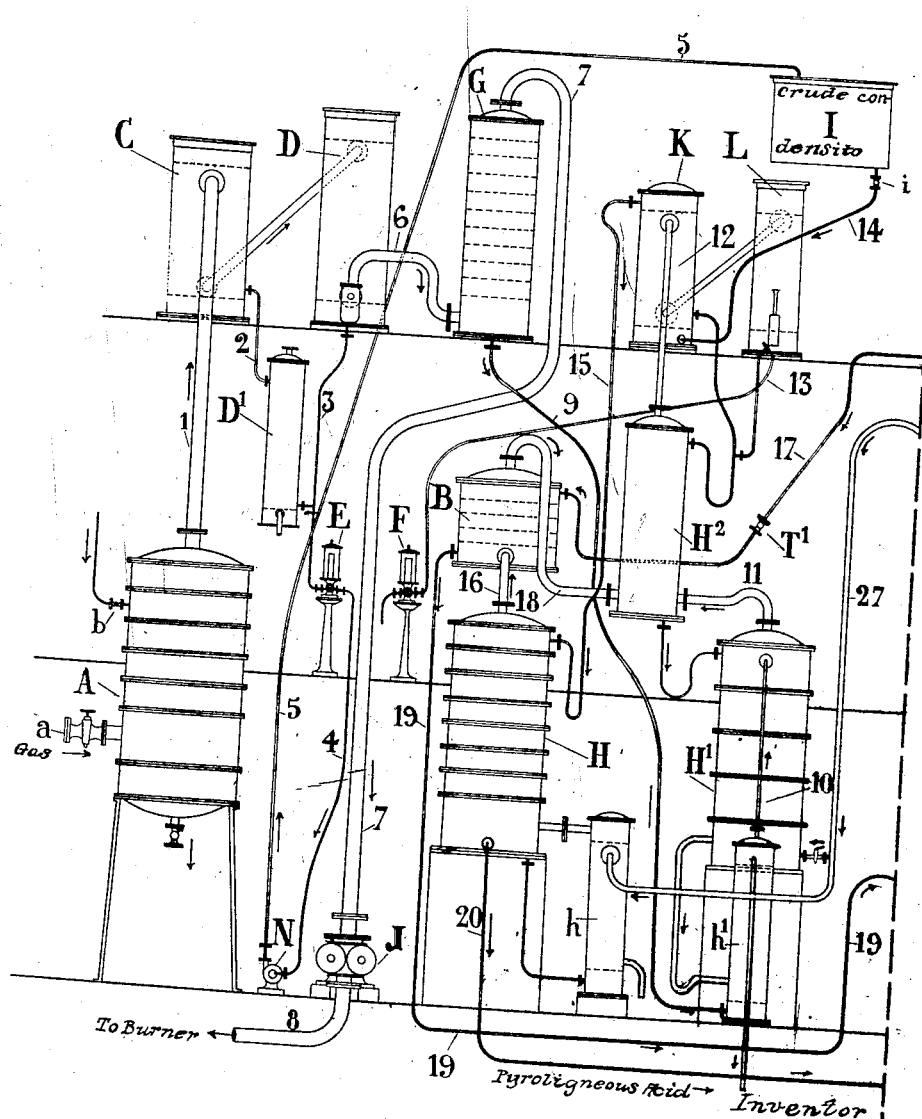
Figure 1 is a diagrammatic view of the whole plant.

Referring to the treatment as effected in Fig. 1, the gases and acid vapors coming from the retorts for the distillation of the wood enter through the valved pipe $a$ into the tar removing apparatus A. This apparatus is so constructed as to retain the greater portion of the tars. From there the vapors passing through the pipe 1 are condensed in C and cooled in D. The liquid condensed in C passes through the pipe 2 and is further cooled in $D^1$; the liquid coming from D flows away through pipe 3, and joining with the liquid coming from $D^1$, both pass through the gage tube E are, after passing through the pipe 4, raised by pump N through the pipe 5, to the upper vessel 1.

The non-condensable gases, cooled in D, pass through the pipe 6 into the lower part of a scrubber G, in which they are washed with water, which removes the methyl alcohol which has not been condensed. The washed gases finally issue through the pipe 7 are forced by the exhauster J through the pipe 8 to a point of use, *e. g.*, to the burners for heating the retorts.

The water issuing from the bottom of G contains about from 1 to 2% of methyl alcohol; it is led by the pipe 9 to the heat exchanger $h^1$, then by the pipe 10 to the distilling column $H^1$; the vapors pass through the pipe 11 into the column $H^2$ on the plates of which the methyl alcohol is brought to a suitable concentration. The methyl alcohol passing through the pipe 12 is condensed in K and cooled in L, and passes through pipe 13 to the gage tube F. The spent liquid from $H^1$ is sent to the sewer after delivering its heat to the water entering the apparatus $H^1$, in the exchanger $h^1$.

The pyroligneous condensate in the vessel I is fed by pipe 14, controlled by feed cock $i$, to the heater K and from there it goes down through the pipe 15 into the top of the distilling column H which is adapted to extract therefrom the methyl alcohol.

The vapors issuing from the column H are very acid. If they are introduced in this condition in the concentrating plates of $H^2$, a large quantity of methyl acetate would be generated. In order to avoid this, the vapors coming from H, through the pipe 16, pass through a small plate column B, called the saturating column. A small quantity of whitewash (milk of lime) from the vessel U goes down through the pipe 17, controlled by the cock $T^1$ and enters the upper part of B. In this manner the methyl alcohol vapors are neutral when they are introduced through the pipe 18 at the bottom of $H^2$, where they are concentrated along with the vapors from $H^1$. The reflux from B, composed of acetate of lime, is led through the pipe 19 into the vessel X, where it mixes with the other acetate of lime produced in the manner described below.

The pyroligeneous liquid freed from methyl alcohol issues at the base of the column H through the pipe 20 and is then to be evaporated. A pump $N^1$ drives it back while it is boiling hot, into the evaporator O or $O^1$.

The evaporator is continuous and replaces the ordinary discontinuous system usually called the "three boiler system," and avoids the disadvantages incident to its use.

In the present system the volumes of the pyroligneous liquid has already been diminished by that of the methyl alcohol driven off in H, and on account of this previous separation, simple evaporation can be effected in a continuous way.

The evaporation apparatus consists of two similar tubular bodies O and $O^1$ each having a capacity substantially sufficient for vaporizing the totality of the pyroligneous liquid; only one of the two bodies O and $O^1$ is in operation at a time, the other, during this time, being cleaned and made ready to work when the first body will become too much fouled by tar for efficient operation. The flow of liquid to the desired one of the two bodies is effected by means of cocks or valves $p$ and $p^1$ for O, and $p^2$ and $p^3$ for $O^1$. The pipe 22 is a continuation of pipe 21, and these pipes, together with the pipes containing valves $p^1$ and $p^3$ for a cross, or a four-way connection.

The pyroligneous liquid, elevated by pump $N^1$ through pipe 21 enters, for instance, the tubular body O through the open valve $p^1$ and ascends rapidly within the tubes. A violent ebullition throws a mixture of steam and liquid through pipe $p$ into the separator P, which is of a very large diameter. The excess of liquid goes down again through 22 and is readmitted through $p^1$. The inlet pipe is provided with an opening $v$ directed downwardly; the liquid follows the path indicated by the curved arrow and in this retrograde movement the tar, which is heavier than water, settles to the bottom of the lower cone from which it is drawn off through the cock in pipe 23, into the well S. The high speed of ascent of the liquid in the tubes O largely prevents the tar from adhering to the tubes and in any case when the choking begins to give trouble, the tubular body O is put out of action and the evaporation is continued in the tubular body $O^1$; the cover V is opened and the tubes are cleaned without waiting for the apparatus to cool.

The separator P is provided at the top with a foam clearing and tar removing apparatus Q so that the acetic vapors which issue from the evaporator are as free as possible from tar. They then pass to the saturating apparatus R through the pipe 24.

R is a continuous saturator or neutralizer. Everything is continuous in the whole of the process.

The saturation is effected at will, either by means of lime or of soda; the reagent is contained in the vessel U, it flows through pipe 25 and the volume of reagent fed is controlled by the cock T. The saturator contains several splashing plates, the saturation being nearly instantaneous. The acetate of lime or soda (in solution) issues through the pipe 26, and then flows to the vessel X, and is subsequently filtered.

The saturator R, while neutralizing the acetic acid condenses but a small fraction of the water vapor coming from the evaporator and this excess is henceforth neutral and entirely free from acetic acid. By reason of the continuity of the operation, this available heat may be easily used. This vapor is sent through pipe 27 to the bases of the distilling columns H and $H^1$, so that both distillations are effected entirely by this by-product steam. The heating of H is effected through the medium of a heat exchanger $h$ so as not to dilute the pyroligneous liquid. For $H^1$, a splasher will be sufficient.

Any excess of steam from R lifting the safety valve $r$, which is adjusted to a pressure of about ½ kilogram, issues through the pipe 28. It may be used for the concentration of the acetate or for any other purposes in the works.

The lime acetate solution in the vessel X is cloudy. It is sent through the pump $N^2$ and the pipe 29 to the filter-press W. The filtered solution flows away through the pipe 30, still lightly colored by tar, and is introduced into a continuous and methodical scrubber M in which the solution of acetate passes downwardly through a column of liquid capable of dissolving and retaining the tar, for example cresol or any suitable hydrocarbon liquid not capable of mixing at all with water (totally insoluble therein) and capable of floating on the surface of the acetate solution, (by reason of a density lower than that of the acetate solution) (this operation being claimed in my co-pending case Serial No. 258,111, filed Ocober 14, 1918.)

The cylinder M is entirely filled with a divided inert material (such as broken glass or quartz, coke, etc.,) in order to increase the contact between the acetate solution and the purifying oil. This oil enters through 31 and issues through 32 to be revivified by distillation. The acetate solution enters through 30, passes downwardly and issues through 33, passes through the control gage tube $m$ into the vessel 34, thence to the acetate evaporation apparatus, which may be a tubular body similar to O—$O^1$—P—Q, heated by the excess steam issuing from the saturator R.

The purification of the pyroligneous acid by means of cresol might also be effected before its neutralization. In this case, the apparatus M would be placed to the left, near the tar removing apparatus A and fed through the pipe 3. The gage tube $m$ would then be replaced by the gage tube E.

Such is the whole of the purification process for pyroligneous acid; this process is entirely continuous, as is also the production of gases and vapors in the battery of wood-distilling retorts. It is to be understood that it will be useful to duplicate the parts A, B and R, so as to be able at fixed times to take them apart to clean them without stopping the works.

A few supplementary remarks will now be given concerning the details of construction of the tar removing apparatus and of the saturator, the other apparatus being of better known construction.

*Tar removing apparatus,* (Figs. 2 and 3).—The tar removing plates might be of any suitable construction. The one here shown reduces to a minimum the frequent and laborious cleaning operations. The construction shown in elevation and section in Fig. 2 and in plan view in Fig. 3, comprises a concave plate *d* provided with a circular cap *e* and an axial cap *f;* this type of plate has the advantage of insuring a large development of the splashing line, an easy circulation of the tar on the plate and a complete independence between the passageways for the gases and vapors on the one hand and the caps which cover them on the other hand. In this manner, when taking the column apart for cleaning, ready access may be had to all parts, above and below the same. The concave shape of the plates makes it possible to do away with any kind of an armature and permits of draining in a better manner, all the tar before taking the column to pieces. For this purpose, a flap valve actuated from the exterior by means of a handle *c* is held closed during the operation and is opened as soon as the operation is over.

The lower part of the tar-removing apparatus is composed of two superposed chambers *k* and *l.* In the upper chamber *k*, the vapors and gases coming in, below the top of the annular cap *s*, are forced to bubble through the bath of tar which is at a high temperature, much over 100° C. The greater part of the small drops of tar are caught therein.

The plates arranged above these two chambers are also splashing or bubbling plates, the caps being slightly immersed in the tar.

In the plates above the lowermost, the caps are not immersed and the retention of the tar globules is secured by the rupture of the films of such globules by striking the surface of the tar bath. Finally, on the uppermost plate there is no tar, the caps acting as foam-catching or foam-breaking devices.

The plates have a second action; that of liberating the pyroligneous acid dissolved in the tar. The tar coming from the barrels arranged on the retorts, enters the tar-removing apparatus at *b* on the second plate, from the top, and gradually overflows from plate to plate.

If resinous woods are distilled, the tar-removing apparatus simultaneously causes the pine oil contained in the tar to distil, which will be found in the acetate of the vessel X.

Lastly the tar goes down into the lower compartment *l* of the tar-removing apparatus, where gas and water vapor are caused to bubble through it so as to complete the elimination of the acetic acid and pine oil from the tar.

A live steam injector *j* sucks a small quantity of the washed gases issuing from the exhauster J, gases which do not contain any oxygen and which mix with the gases of the same composition coming through *a*. The system of driving back by means of an injector gives the advantage of a simultaneous heating of the tar. The mixture of gas and water vapor is introduced into the tar by means of a perforated bubbler *x;* it drives away the pyroligneous acid as vapor, through the central passage-way $l^1$, and the whole mixed with the gases of the retorts ascends through the several tar-removing plates.

*Saturator,* (Fig. 4).—In the same way as for the tar-removing apparatus ordinary cap plates might be used, but they would necessitate more frequent and more laborious cleaning operations. For the same reasons, it is preferable to use the readily examinable caps described above.

The admission of the reagent through the pipe 25 will be controlled by sampling, in the pipe 27 (Fig. 1) the vapor, which must be entirely free from acidity, this being verified by blue litmus paper. It is of no consequence if the liquid issuing through 26 should have an acid reaction; in this case the neutralization would be completed in the vessel X. In this way there is not much risk of soiling and incrusting the plates of the saturator.

In the improved modification of the saturator shown in Fig. 4, the two lowermost plates are used for washing the vapors with water, to retain a portion of the tar, prior to the neutralization of the acetic acid vapors by milk of lime. For this purpose water is introduced through the valve *t*, the used water being drawn off by the siphon formed of the pipe *n*—36, this siphon having an upwardly extending air pipe 107, to prevent priming. It is accordingly possible to draw off the most tarry water, through the pipe 33.

The acetate of lime must be prevented from mixing with the wash water and consequently the acetate solution is drawn off separately through the overflow *o* and the bent pipe *g*, pipe 26, into the vessel X. (Fig. 1).

Fig. 5 illustrates an apparatus for carrying out the process in case a less pure acetate of lime would be satisfactory.

In this form of device, A designates the tar-removing apparatus.

The saturator R is arranged adjacent to the said apparatus and receives the vapors, freed from tar, directly through the pipe 35.

The vapor containing methyl alcohol, issuing from the top of R through 39, is condensed in C and D, the liquid containing methyl alcohol flows into the rectifier H, H¹, through the pipes 40 and 9, and heat exchanger 100.

The non-condensable gases enter the scrubber G through the pipe 2, and the scrubbing water passes down through the pipe 9 into the rectifier H, H¹. The vapors of methyl alcohol are condensed and cooled at K and L. A single raw methyl alcohol gage tube E will be sufficient unless it is desired to effect immediately a fractionation of the head and tail products, which operation is easy to do.

The acetate solution from X is pumped by N² through pipe 29, and filter-press W. Before concentrating the filtered acetate solution, it may be passed through the washing apparatus M for retaining the remaining tar by means of the cresol, as above described.

Finally, the pump N³ sends the acetate to the single or double effect evaporator; the excess steam therefrom may be used for heating the distilling column H, H¹.

This form of execution of the invention is not only more simple concerning the construction, but is especially much more economical in steam than that illustrated in Fig. 1 and it should be preferred if the quality of the acetate is sufficient to meet the existing demand.

I claim:

1. A process of treating the gases and vapors produced in the destructive distillation of woody material, such process comprising continuously removing the major part of the tar from the vapors, while at a temperature above the condensation point of acetic acid at the existing pressure, continuously cooling the remaining gases and vapors to condense out the pyroligneous condensate, continuously scrubbing the remaining gases and vapors to remove the last of the methyl alcohol and to leave a combustible gas suitable for use as fuel, continuously heating the wash liquor and continuously heating the condensate of the said cooling operation to obtain methyl alcohol vapor, washing the vapors of such second heating operation with an alkali to remove acids therefrom, bringing together the alcohol-containing vapors of said two heating operations, and condensing the same to produce methyl alcohol, again continuously boiling the condensate from which the methyl alcohol has been distilled, and continuously passing the vapors in contact with an alkaline material to produce an acetate liquor, and continuously passing such acetate liquor through a water-insoluble liquid capable of dissolving tarry material therefrom.

2. In the treatment of the gases and vapors of destructive distillation of wood, the steps of first washing the gases and vapors with tar, said tar being, during a part at least of such washing operation, maintained at a temperature above the temperature at which pyroligneous acid and methyl alcohol would be retained in substantial amount thereby, passing at least the pyroligneous acid content of said gases and vapors, while in vapor form, into contact with an alkaline absorbent liquid to produce a pyrolignite liquor, condensing methyl alcohol from the gases and vapors at a suitable stage of the process, and filter-pressing the pyrolignite liquor, and washing the pyrolignite liquor with a liquid tar absorbent which is insoluble in said liquor.

In testimony whereof I have signed my name to this specification, in the presence of two subscribing witnesses.

EMILE AUGUSTIN BARBET.

Witnesses:
 LUCIEN PAILLARD,
 TRACY LAY.